US012358203B2

(12) United States Patent
Guilani et al.

(10) Patent No.: US 12,358,203 B2
(45) Date of Patent: Jul. 15, 2025

(54) ELEVATOR LOAD BEARING SUSPENSION MEMBER INCLUDING A CORROSION INHIBITOR IN THE JACKET

(71) Applicant: OTIS ELEVATOR COMPANY, Farmington, CT (US)

(72) Inventors: Brad Guilani, Woodstock Valley, CT (US); David R. Torlai, Torrington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 167 days.

(21) Appl. No.: 17/983,536

(22) Filed: Nov. 9, 2022

(65) Prior Publication Data

US 2024/0149516 A1 May 9, 2024

(51) Int. Cl.
*B29C 48/88* (2019.01)
*B29C 48/00* (2019.01)

(52) U.S. Cl.
CPC .......... *B29C 48/919* (2019.02); *B29C 48/022* (2019.02)

(58) Field of Classification Search
CPC ....... B29C 48/919; B29C 48/022; B66B 7/06; B66B 7/062; B66B 5/00
USPC .......................... 428/364, 549; 427/434, 427
See application file for complete search history.

(56) References Cited

U.S. PATENT DOCUMENTS

2013/0171463 A1* 7/2013 Chang .................... D07B 1/162 427/427
2020/0048043 A1* 2/2020 Zhao ........................ D07B 1/16
2020/0232160 A1* 7/2020 Longatti ................ D07B 1/162

* cited by examiner

*Primary Examiner* — Camie S Thompson
(74) *Attorney, Agent, or Firm* — Carlson, Gaskey & Olds, P.C.

(57) ABSTRACT

A load-bearing elevator suspension member includes a plurality of tension members and a compressible jacket at least partially encasing the plurality of tension members. The jacket includes a jacket base material mixed with a corrosion inhibitor that establishes a corrosion-inhibiting coating on the tension members. A method of making such a load-bearing elevator suspension member includes mixing the corrosion inhibitor into a thermoplastic jacket material and applying the resulting mixture to bare steel tension members. As the corrosion inhibitor in the mixture contacts the tension members, the corrosion inhibitor establishes a corrosion-inhibiting coating on the tension members.

9 Claims, 3 Drawing Sheets

ELEVATOR LOAD BEARING SUSPENSION MEMBER INCLUDING A CORROSION INHIBITOR IN THE JACKET

BACKGROUND

Elevator systems are in widespread use for carrying passengers between various levels in buildings, for example. Some elevator systems are traction-based in which roping that suspends the elevator car and a counterweight facilitates movement of the elevator car when needed. Traditional roping arrangements include round steel ropes. More recently, elevator systems have included flat belts or other types of ropes that have multiple steel cords encased in a compressible polymer jacket.

Such suspension members typically include a corrosion-inhibiting coating on the steel cords to satisfy elevator codes and to prolong the useful service life of the belt or rope. Precoated steel wires or strands are more expensive than uncoated steel. It would be beneficial to be able to satisfy elevator code requirements without incurring the additional expense.

SUMMARY

An illustrative example method of making a load-bearing elevator suspension member includes mixing a corrosion inhibitor into a jacket base material and applying the jacket base material including the corrosion inhibitor to a plurality of tension members to thereby form a jacket at least partially encasing the tension members. The corrosion inhibitor mixed into the jacket base material establishes a corrosion-inhibiting coating on the tension members as corrosion inhibitor contacts the tension members.

In addition to one or more of the features described above, or as an alternative, the jacket base material is thermoplastic, and the corrosion inhibitor is one of anodic, cathodic or organic.

In addition to one or more of the features described above, or as an alternative, the jacket base material comprises a thermoplastic elastomer.

In addition to one or more of the features described above, or as an alternative, the corrosion inhibitor comprises an organic heterocyclic compound containing nitrogen and or sulfur.

In addition to one or more of the features described above, or as an alternative, mixing the corrosion inhibitor into the jacket base material comprises establishing a compounded jacket material including up to 2.5% by weight of the corrosion inhibitor.

In addition to one or more of the features described above, or as an alternative, the compounded jacket material includes 0.5% by weight of the corrosion inhibitor.

In addition to one or more of the features described above, or as an alternative, the compounded jacket material includes up to 0.1% by weight of the corrosion inhibitor.

In addition to one or more of the features described above, or as an alternative, the corrosion inhibitor comprises at least one of sulfur, tryptamine, caffeine, vanillin, In addition to one or more of the features described above, or as an alternative, the tension members comprise bare steel.

In addition to one or more of the features described above, or as an alternative, establishing the corrosion-inhibiting coating on the tension members comprises passivating a surface of the tension members with the corrosion inhibitor.

An illustrative example embodiment of a load-bearing elevator suspension member includes a plurality of tension members; and a compressible jacket at least partially encasing the plurality of tension members, the jacket including a jacket base material mixed with a corrosion inhibitor, wherein the corrosion inhibitor establishes a corrosion-inhibiting coating on the tension members.

In addition to one or more of the features described above, or as an alternative, the tension members each comprise steel and the only corrosion-inhibiting coating on the tension members is established by the corrosion inhibitor mixed with the jacket base material.

In addition to one or more of the features described above, or as an alternative, the jacket base material is thermoplastic, and the corrosion inhibitor is one of anodic, cathodic or organic.

In addition to one or more of the features described above, or as an alternative, the jacket base material comprises a thermoplastic elastomer.

In addition to one or more of the features described above, or as an alternative, the corrosion inhibitor comprises an organic heterocyclic compound.

In addition to one or more of the features described above, or as an alternative, the jacket includes up to 2.5% by weight of the corrosion inhibitor.

In addition to one or more of the features described above, or as an alternative, the jacket includes up to 0.5% by weight of the corrosion inhibitor.

In addition to one or more of the features described above, or as an alternative, the jacket includes up to 0.1% by weight of the corrosion inhibitor.

In addition to one or more of the features described above, or as an alternative, the corrosion inhibitor comprises at least one of sulfur, tryptamine, caffeine, vanillin, thymol, or carvacrol.

In addition to one or more of the features described above, or as an alternative, the jacket has a rectangular cross-sectional profile and the load-bearing elevator suspension member is a belt.

The various features and advantages of an example embodiment will become apparent to those skilled in the art from the following detailed description. The drawings that accompany the detailed description can be briefly described as follows.

DETAILED DESCRIPTION

Figure 1:
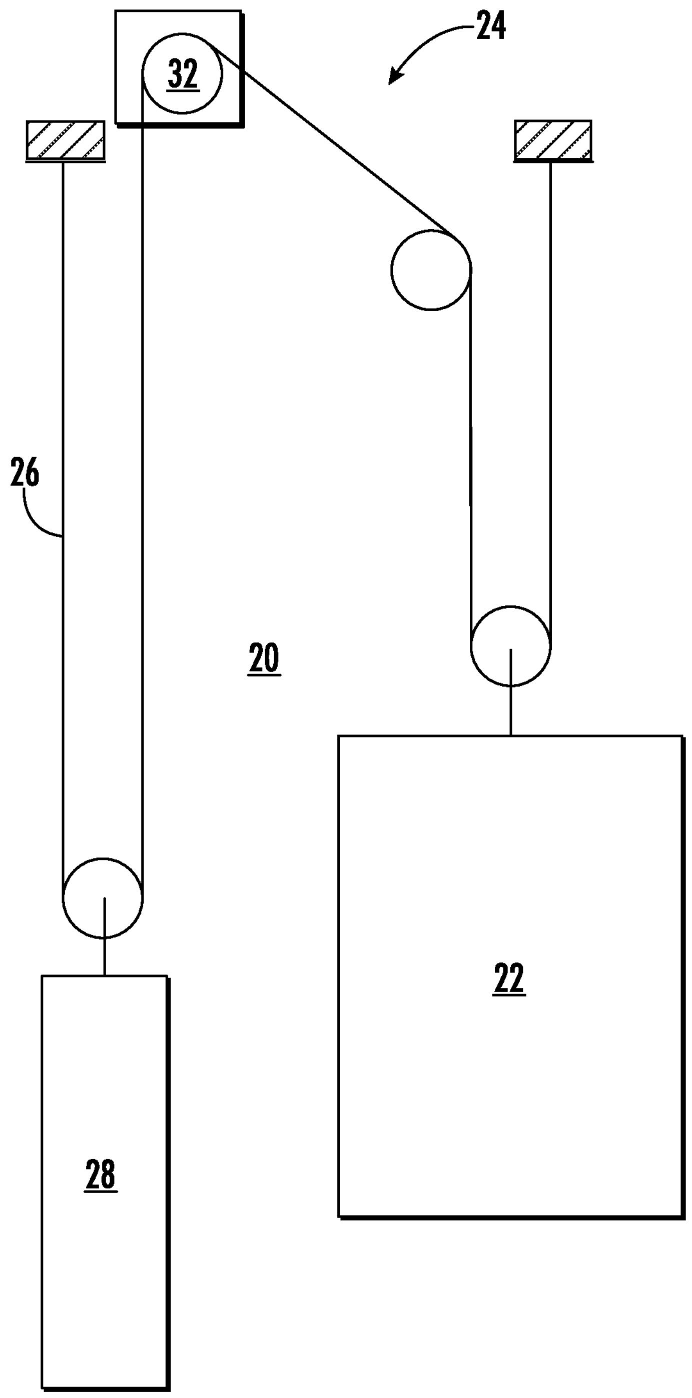
FIG. 1 schematically illustrates selected portions of an elevator system.

FIG. 1 schematically illustrates selected portions of an elevator system 20. An elevator car 22 is supported by a roping arrangement or suspension assembly 24 that includes a plurality of load-bearing suspension members 26. The elevator car 22 is coupled to a counterweight 28 by the suspension members 26. As the suspension members 26 move in response to rotation of a traction sheave 32, the elevator car 22 and counterweight 28 move vertically.

Figure 2:
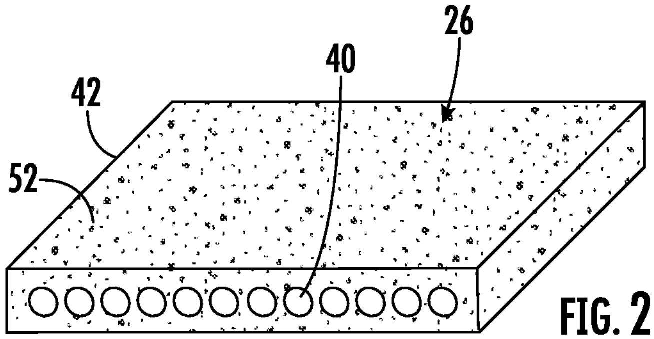
FIG. 2 schematically illustrates a portion of an example suspension member including a corrosion inhibitor within the material of a compressible jacket.

FIG. 2 schematically illustrates a portion of an example suspension member 26. In the illustrated embodiment, the suspension member 26 is a flat belt including a plurality of tension members 40 encased in a jacket 42 of a compressible material. In many embodiments, the tension members 40 comprise steel cords.

The steel cords of the tension members 40 do not have an anti-corrosion coating prior to being incorporated into the suspension member 26. Instead, the anti-corrosion protection comes from a component of the jacket 42.

Figure 3:
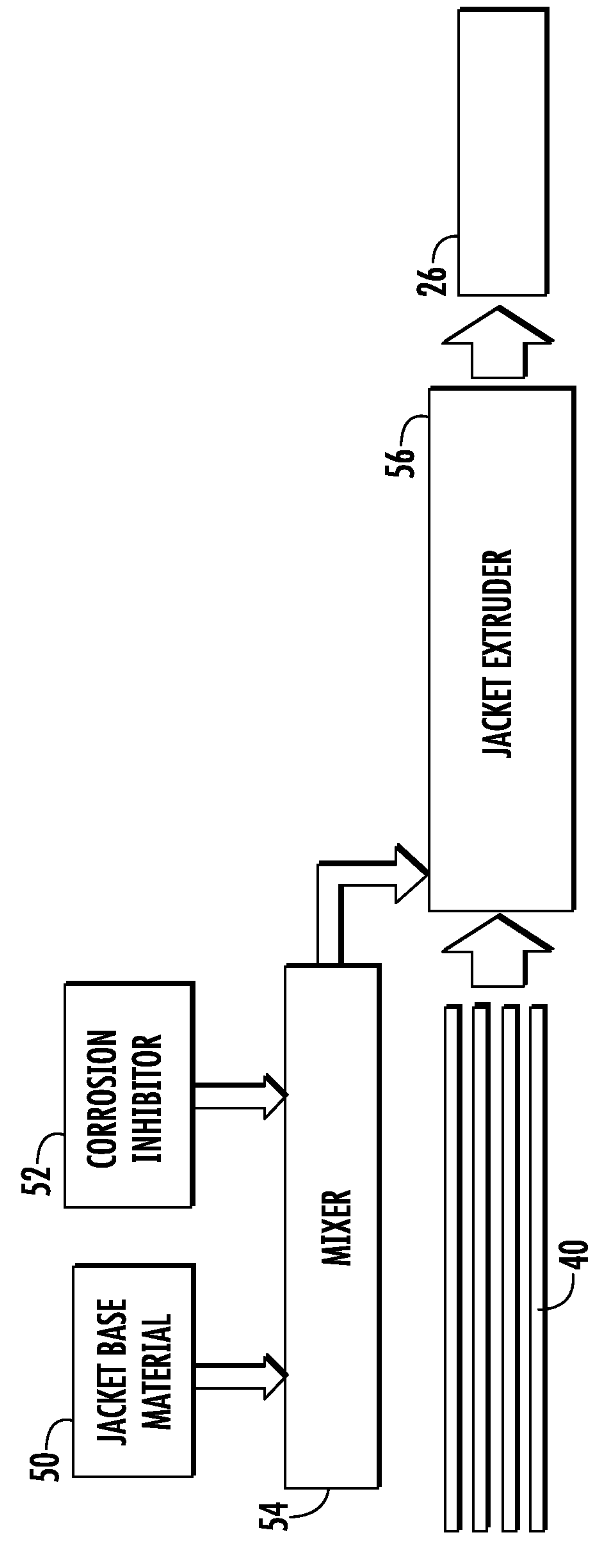
FIG. 3 schematically illustrates an example method of making a suspension member of an elevator system.

FIG. 3 schematically illustrates a process of making the suspension members 26. The jacket 42 comprises a base jacket material 50, such as a thermoplastic, and a corrosion inhibitor 52. The base material 50 and the corrosion inhibitor 52 are mixed in a mixer 54 and then fed into a jacket extruder 56. The steel cord tension members are inserted into the jacket extruder 56 where the tension members are at least partially encased in the jacket material, resulting in a suspension member 26 having a configuration like that shown in FIG. 2, for example.

The steel cords of the tension members 40 do not have any pretreatment to provide corrosion protection prior to being encased in the jacket 42. The strands and cords of the tension members 40 are made of bare steel, without any primer or other surface treatment, in the example embodiment. The corrosion inhibitor 52 mixed into the jacket material contacts the steel cords of the tension members 40 and provides anti-corrosion protection for the tension members 40. In some embodiments, the corrosion inhibitor 52 binds to the surface of the tension members 40 and establishes a corrosion-inhibiting coating on the tension members 40. The resulting jacket 42 includes the corrosion inhibitor 52 within portions of the jacket 42 that are not in direct contact with the tension members 40.

In some embodiments, the corrosion inhibitor 52 is at least partially soluble in the base jacket material 50. While the jacket material is in a molten state, at least some of the corrosion inhibitor 52 migrates within the jacket material toward and into contact with the tension members 40 before the jacket solidifies. The corrosion inhibitor 52 comprises a compound or substance that has sufficient thermal stability to retain its corrosion-inhibiting properties when exposed to the elevated temperatures of the jacket material during the compounding and extrusion before the jacket 42 solidifies.

The corrosion inhibitor 52 may be anodic, cathodic or organic. When the corrosion inhibitor 52 is organic, it establishes the anti-corrosion coating on the tension members by passivating the surface of the tension members.

The corrosion inhibitor 52 in example embodiments comprises at least one of an organic heterocyclic compound containing nitrogen and or sulfur, tryptamine, caffeine, vanillin, thymol, or carvacrol.

The mixture of the base jacket material 50 and the corrosion inhibitor 52 includes up to 2.5% by weight corrosion inhibitor 52. In some embodiments, the corrosion inhibitor 52 is up to 0.5% by weight of the mixed jacket material. In other embodiments, the jacket material mixture includes up to 0.1% of corrosion inhibitor 52 by weight.

The jacket base material 50 and the corrosion inhibitor 52 form a compressible jacket. The base material 50 comprises a thermoplastic elastomer including but not limited to polyurethane in some embodiments and the corrosion inhibitor 52 does not alter the compressibility or the traction characteristics of the jacket 42.

Including a corrosion inhibitor in the jacket material instead of coating the tension members 40 prior to incorporating them into a suspension member 26 provides cost savings and increases the source options for the steel that is used for the tension members.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A load-bearing elevator suspension member, comprising:

a plurality of tension members; and a compressible jacket at least partially encasing the plurality of tension members, the jacket including a jacket base material mixed with a corrosion inhibitor, wherein the corrosion inhibitor establishes a corrosion-inhibiting coating on the tension members, and wherein the corrosion inhibitor comprises at least one of sulfur, tryptamine, caffeine, vanillin, thymol, or carvacrol.

2. A load-bearing elevator suspension member, comprising:

a plurality of tension members;

a compressible jacket at least partially encasing the plurality of tension members, the jacket including a jacket base material mixed with a corrosion inhibitor, wherein during encasement of the plurality of tension members, the corrosion inhibitor establishes a corrosion-inhibiting coating on the tension members that is encased by the compressible jacket; and wherein the jacket base material comprises a first material and the corrosion inhibitor comprises a second material different than the first material.

3. The load-bearing elevator suspension member of claim 2, wherein the second material is at least partially soluble in the first material.

4. The load-bearing elevator suspension member of claim 3, wherein at least some of the second material migrates within the first material into contact with the plurality of tension members before the compressible jacket solidifies.

5. The load-bearing elevator suspension member of claim 4, wherein the plurality of tension members are uncoated prior to being encased within the compressible jacket.

6. The load-bearing elevator suspension member of claim 4, wherein portions of the second material within portions of the first material are not in direct contact with the plurality of tension members.

7. The load-bearing elevator suspension member of claim 4, wherein the first material comprises a thermoplastic material and the second material comprises an organic heterocyclic compound.

8. The load-bearing elevator suspension member of claim 7, wherein thermoplastic material and the organic heterocyclic compound are mixed together to form a molten mixture, and wherein uncoated tension members are received within the molten mixture which solidifies to form the compressible jacket.

9. A load-bearing elevator suspension member, comprising:

a plurality of tension members;

a compressible jacket at least partially encasing the plurality of tension members, the jacket including a jacket base material mixed with a corrosion inhibitor, wherein during encasement of the plurality of tension members, the corrosion inhibitor establishes a corrosion-inhibiting coating on the tension members that is encased by the compressible jacket; and wherein the compressible jacket and the corrosion-inhibiting coating are distinct from each other.

* * * * *